Figure 1:
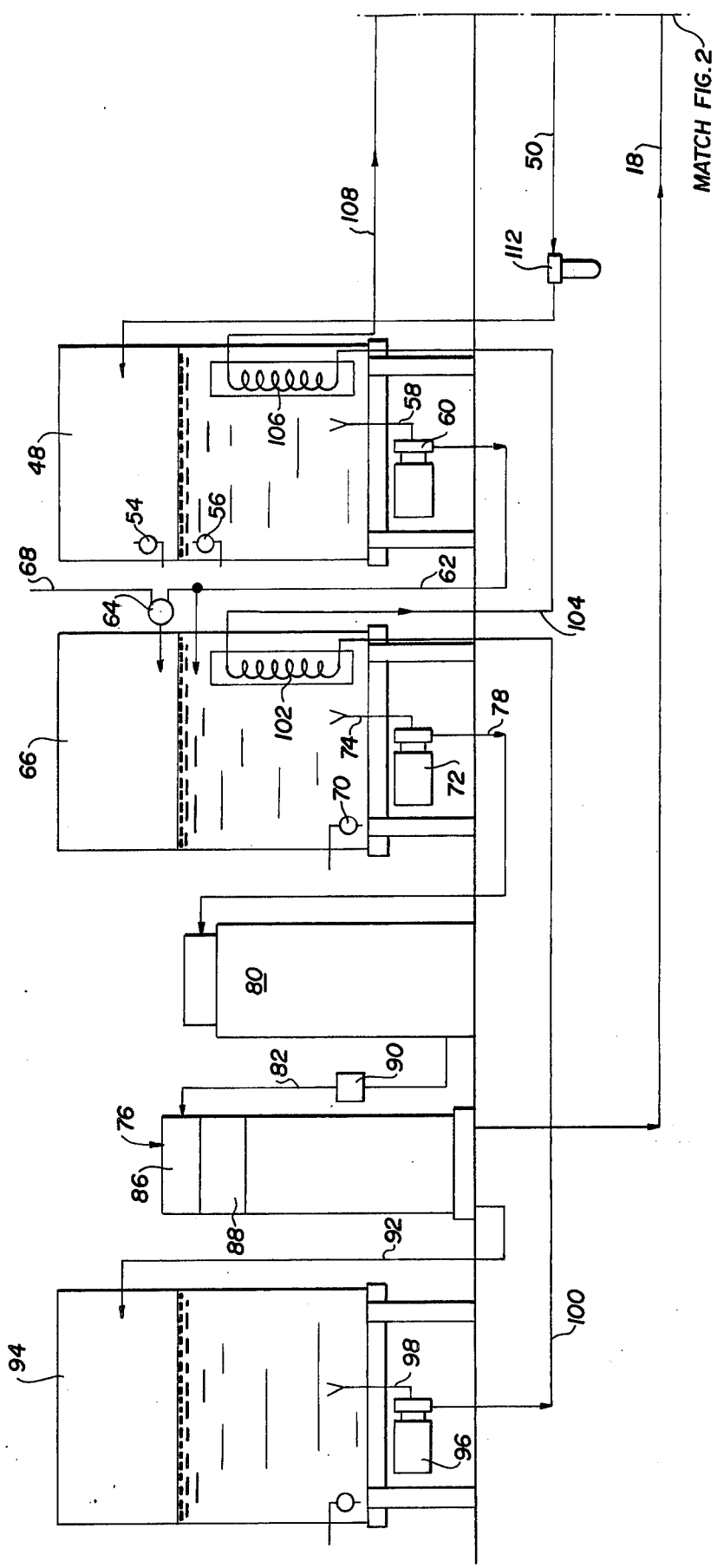

United States Patent [19]

Andrews et al.

[11] 4,156,621
[45] May 29, 1979

[54] REGENERATION OF USED DISHWASHING WATER WITHOUT CHEMICAL ADDITIVES FOR SANITIZING AND SPOT-FREE RINSE USES

[75] Inventors: James P. Andrews, Kennersville; Arthur C. Callahan, Winston-Salem, both of N.C.

[73] Assignee: American Sterilizer Company, Erie, Pa.

[21] Appl. No.: 837,320

[22] Filed: Sep. 28, 1977

[51] Int. Cl.² .......................... B08B 3/00; B08B 9/04; B01D 13/00
[52] U.S. Cl. ..................................... 134/10; 134/108; 134/109; 210/23 H
[58] Field of Search ...................... 134/10, 18, 60, 108, 134/109; 210/23 H, 23 F, 321 R, 149, 181, 195 R

[56] References Cited

U.S. PATENT DOCUMENTS

| | | | |
|---|---|---|---|
| 2,619,097 | 11/1952 | Brömssen | 134/60 |
| 2,949,119 | 8/1960 | Smith | 134/108 |
| 2,981,415 | 4/1961 | White | 210/149 |
| 3,502,215 | 3/1970 | Cahan | 210/167 |
| 3,505,216 | 4/1970 | Kryzer | 210/23 H |
| 3,756,408 | 9/1973 | Spatz et al. | 210/321 |
| 3,823,086 | 7/1974 | Schmidt | 210/23 H |
| 3,899,348 | 8/1975 | Tedden | 134/60 |

FOREIGN PATENT DOCUMENTS 2510927  10/1975  Fed. Rep. of Germany ............. 134/60

OTHER PUBLICATIONS

*Tech Data* Champion Industries Inc. R.O. Unit 6802(1M), 4/76.

Primary Examiner—R. E. Serwin
Assistant Examiner—Chris Konkol
Attorney, Agent, or Firm—Shanley, O'Neil & Baker

[57] ABSTRACT

An improved dishwashing system includes operating methods and apparatus for water and energy conservation and elimination of spot-reducing chemicals in the rinse water. Return water from the rinse cycle is stored in insulated tanks and rinse water flowing to the dishwasher absorbs heat from the return water to thereby conserve the heat energy of the return water while simultaneously cooling the return water to a selected temperature in preparing a feed solution for membrane separation. A controlled quantity of make-up water is added to the feed solution which is raised to a selected pressure to provide for reverse osmosis purification and deionization. The reverse osmosis effluent is accumulated and, when needed, boosted in pressure to a desired operational dishwasher pressure, and heated to sanitizing level so as to achieve desired bacterial count levels during rinse cycles. Rinsing with the purified and deionized water results in film-free and spot-free dishes after drying.

9 Claims, 2 Drawing Figures

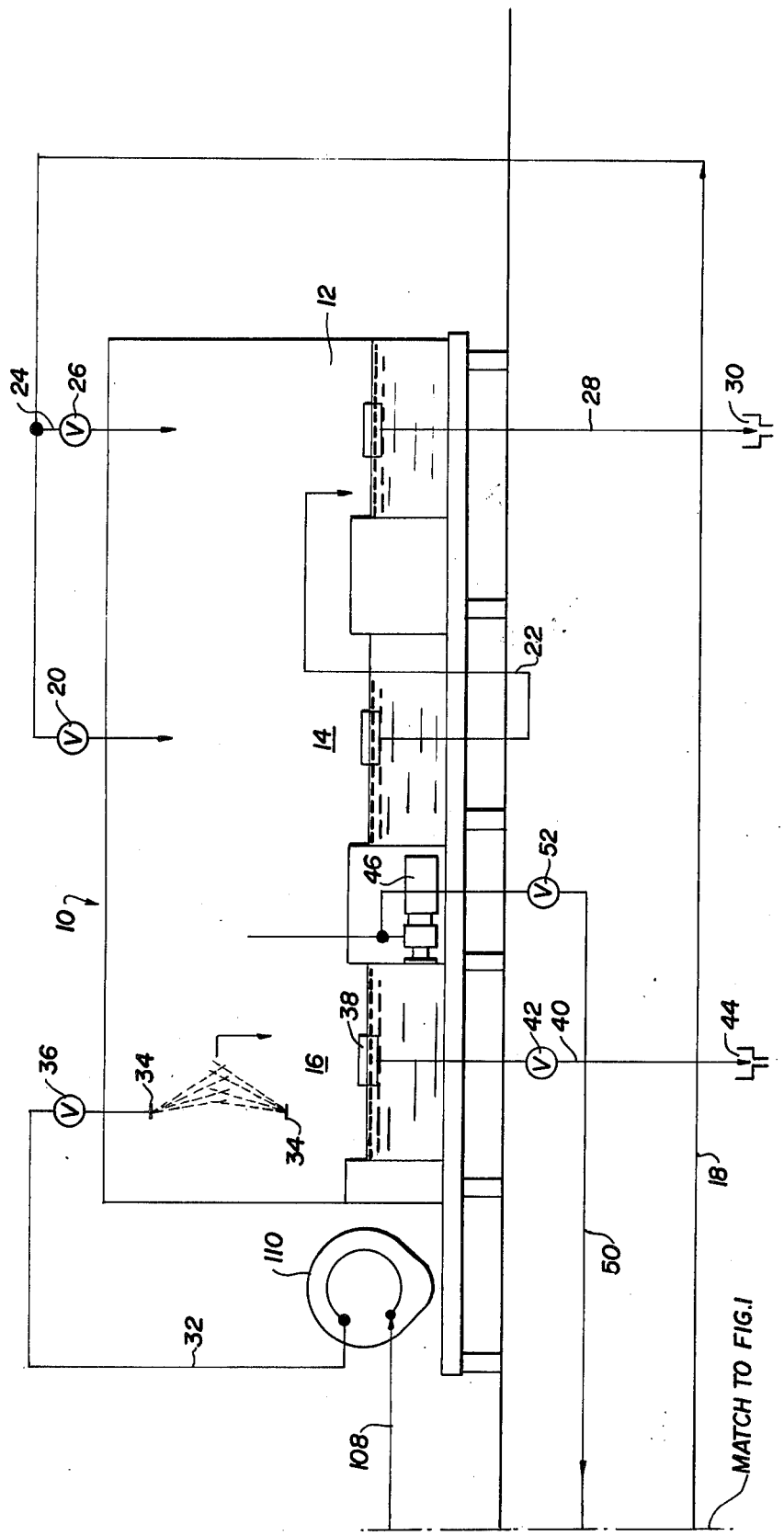

REGENERATION OF USED DISHWASHING WATER WITHOUT CHEMICAL ADDITIVES FOR SANITIZING AND SPOT-FREE RINSE USES

This invention relates to conservation of water and energy by the regeneration and recycling of dishwater. More particularly, the invention is concerned with a method of and apparatus for supplying purified and deionized water, including regenerated used dishwasher rinse water, providing sanitizing and rinsing without relying on chemical additives to produce a film-free and spot-free product.

Prior dishwashing practice, using water supplies available in a particular locale, has generally relied on selective addition of chemical agents to the rinse water to produce a spot-free finish on dishes giving the appearance of cleanliness and a sanitary condition. Due to the disparity between water supplies at differing times and locales, such prior practice required pretesting and impeded standardization of selected chemical additives to reduce spotting. As a result, the product washed in accordance with the prior practice can be coated with a pollutant or a pollutable film. In contrast, the present invention provides for film-free and spot-free washed product sanitized to a bacteria count below that specified by the American Hospital Standards Association for hospital uses.

In general, wetting agents (see, for example, U.S. Pat. Nos. 3,563,901, and 3,592,774) have been used in the rinse water of commercial dishwashers to create a spot-free appearance and such chemical additives can add their own pollution problems. The testing required, the buying and adding of the chemicals, and pollutant control all add to the cost and inefficiency of prior art practice, whereas the present invention reduces costs and increases efficiency by a continuous reduction of pollutants and improved sanitation control, and by conservation of water and energy. The elimination of additives from the rinse water simplifies treatment of the waste water. Also, by reducing the amount of rinse water discharged to waste, temperature pollution is reduced.

In place of the wetting agent approach of the prior art, the present invention provides rinse water, at least a substantial portion of which is regenerated used rinse water, by removal of solutes and deionization of the water for chemical-free and spot-free sanitizing rinsing of the washed product. The reverse osmosis, membrane separation technique is adapted, in accordance with the teachings of the invention, to a dishwashing system for final purification and deionization of the rinse water. While the reverse osmosis principle has been used for treatment of brackish water (see, e.g., U.S. Pat. Nos. 3,702,658 and 3,710,945) and industrial pollution control (see, e.g., U.S. Pat. No. 3,756,408), the concept advanced of providing solute-free and deionized rinse water including regenerated and recycled dishwasher rinse water, for sanitizing dishwashing uses, provides important and unexpected contributions.

Advantages and contributions are covered in the detailed description of a dishwashing system embodying the invention as shown in the accompanying drawings, in which:

FIG. 1 is a portion of a schematic illustration of a dishwashing system embodying the invention; and FIG. 2 is the remaining portion of the schematic illustration.

In the drawings, a dishwashing system embodying the invention is schematically illustrated as including a dishwasher 10 having a pre-wash station 12, a wash station 14, and a rinse station 16 for final rinsing of dishes passing through the apparatus. Washing water is continuously supplied to the wash station 14 through a supply line 18 and valve 20. Used dishwater is removed from the wash station at the same rate that fresh water is supplied, with the used dishwater flowing through line 22 to pre-wash station 12. An additional quantity of fresh make-up water is supplied to the pre-wash station through connecting line 24 joined to supply line 18, with flow through the connecting line being controlled by a valve 26. Pre-wash water is continuously drained from station 12, through a skimmer drain 28, and discharged into a sump or sewer drain 30. Rinse water treated and heated to the desired temperature in accordance with the present invention is supplied through line 32 connected to spray bars 34 at the rinse station 16. Flow through the line 32 can be controlled by valve 36.

The used rinse water is collected in a sump in the bottom of the washing apparatus at the rinse station, and a portion of this water is drained, through a top or skim drain 38, drain line 40, and valve 42 to a sump or sewer drain 44. Preferably about 25% of the rinse water delivered to the rinse station is drained through this skim drain system. The remaining portion of the used rinse water is recirculated, by pump 46, to an insulated heat recovery and storage tank 48 through line 50 and valve 52. High and low level floats 54, 56, respectively, control the level of the recirculated rinse water in tank 48.

A drain 58 in storage tank 48 is connected to a pump 60 for delivering stored, used rinse water, through line 62 and mixing valve 64, to a second heat recovery and storage tank 66. A fresh-water make-up line 68 is also connected to mixing valve 64, and valve 64 can be pre-set to deliver a predetermined proportion of fresh water and recirculated rinse water into the second, insulated, heat recovery and storage tank 66. By way of example, in a typical commercial dishwashing installation, valve 64 may mix approximately 3.4 gallons per minute of fresh water with 4.1 gallons per minute of used rinse water, for a total flow into the second storage tank of 7.5 gallons per minute during operation of the system. A suitable float actuated low level control 70 may be provided in tank 66 to maintain a minimum level of water in the tank.

A high pressure pump 72 having its inlet connected to a drain 74 in the second heat recovery and storage tank 66 supplies water at a pressure within the range of 400 to 450 psig to a reverse osmosis unit 76. High pressure water from pump 72 can flow through line 78 to a conventional water softener 80 having its outlet connected, by line 82, to the reverse osmosis unit 76.

The reverse osmosis unit 76 can be a commercially available unit suitable for purification and deionization of the feed solution consisting of a mixture of recycled rinse water and fresh water. The unit employs commercially available separation components such as the "Permastep" permeator available from E. I. Dupont deNemours & Co., Inc., Permastep Products, Wilmington, Del. The unit can employ two permeators, illustrated schematically at 86, 88, connected in tandem in a known manner, for increased efficiency and capacity. The capacity of the reverse osmosis unit can be selected by the number and arrangements of permeators used, in accordance with known practice, to readily provide capacities from about 1000 to about 10,000 gallons per day, and multiple units can be used when required. For protection of the permeator, a pressure and temperature sensing unit 90 is connected in line 82 supplying water to the reverse osmosis unit, with the sensing unit being connected in the power circuit to pump 72 to stop operation of the pump in the event that the pressure and temperature of water flowing to the unit 76 is outside the prescribed limits for the unit. The temperature of water supplied to the unit is controlled in the manner described hereinbelow.

The reverse osmosis unit 76 can be operated to recover or purify approximately 75% of the water supplied through line 82. The remaining 25% of the water supplied to unit 76 can be directed, through line 18, to the pre-wash and wash stations, 12, 14, of dishwasher 10. The purified and deionized effluent from reverse osmosis unit 76 flows through line 92 to a reverse osmosis water storage tank 94 for use, as required, in the final rinsing station of the dishwasher.

A pump 96 having its inlet connected through drain 98 to the storage tank 94 supplies treated water at the desired pressure through line 100 to the final rinsing stage of the dishwasher. Line 100 is connected to the inlet of a heat exchanger 102 positioned within the storage tank 66 so that treated water flowing through the heat exchanger will absorb heat from the water stored in the tank. This serves the double function of preheating the water for rinsing while cooling the water in the tank to a safe level for supply to the reverse osmosis unit 76.

From heat exchanger 102, the treated water flows through line 104 to a second heat exchanger 106 located in the first storage tank 48. Since the entire content of tank 48 is recycled heated rinse water, a substantial amount of heat is absorbed from the water stored in the tank by the water flowing through exchanger 106. The preheated water leaves heat exchanger 106 through a line 108 which is connected to the inlet of a heater 110 which boosts the temperature of the water to the required level for final rinsing and sterilizing in the dishwasher. Preferably the temperature of the treated water entering the rinsing station is at least 180° F. to produce the degree of sterilization generally required for use in hospitals and the like.

In a typical dishwashing system of the type described, the final rinse water entering the dishwashing machine at a temperature of 180° F. will be cooled to approximately 160° F. in the sump of the rinse station. This temperature may drop another 5° to 155° F. by the time it reaches the first heat recovery and storage tank 48. The temperature of water flowing from tank 48 through line 62 may be approximately 100° F. and will be mixed with make-up fresh water having a temperature of approximately 60° F. Treated rinse water from the storage tank 94 may enter heat exchanger 102 at a temperature of about 71° F. and exit at about 76° F., whereas water from the tank 66 may have a temperature of approximately 74° F. in the water softener 80, which temperature may be further reduced by the time it reaches the reverse osmosis unit so that the temperature is well within safe operating ranges of the permeators.

The temperatures at the various positions in the system will, of course, vary and those mentioned above are given by way of example only. Further, some control may be maintained by controlling the temperature of the fresh water make-up supplied to the second storage tank 66, the exposure or insulation of lines, and the like.

The used rinse water from pump 46 is preferably passed through a suitable filter 112 to remove solid suspensions in a conventional manner. Additional filters and treatment devices can be used in this system, as necessary or desired. For example, a conventional sub-micron filter may be provided in the fresh-water make-up line, and/or a carbon filter employed where the reduction of chlorine in the make-up water is desirable. Further, the water softener 80 may be connected in the fresh-water make-up line so that only the fresh water entering the system is treated by the water softener, or the water softener may not be required at all.

After initial start-up of the apparatus, the water which passes through the reverse osmosis unit preferably consists of a greater proportion of recycled rinse water than fresh water. During operation, the reverse osmosis unit purifies and deionizes the water to remove from 90% to 95% of the ionized dissolved mineral salts and up to about 99% of the non-ionized organic compounds. This high degree of water purification eliminates the necessity for chemical agents added to the rinse water for prevention of spotting and enhancing of drying of the washed and rinsed product since the highly purified water does not leave a film to produce spotting. Elimination of chemicals greatly facilitates recycling of the rinse water and eliminates the problem of chemical pollution from the waste rinse water.

After the initial start-up of the system, a reserve supply of reverse osmosis treated water is accumulated in the storage tank 94 and a reserve supply of recycled rinse water and mixed rinse water and fresh water is continuously maintained in tanks 48 and 66.

The system enables the ready control of the input of feed solution to the reverse osmosis membrane separation unit to maintain the temperature within the range of 70° to 80° F., as required for most efficient operation of the unit and to avoid damage to the membrane separation elements. A single high pressure pump is sufficient to maintain the pressure supplied to the reverse osmosis unit within the range of 400 to 450 psig to provide efficient membrane separation, whereas the remaining pumps operate at a lower discharge pressure for economy of operation and cost.

The use of the heat exchangers in the storage tanks 48 and 66 serve the dual function of assisting in the control of the temperature of the feed solution to the reverse osmosis unit and of conserving energy by reducing the amount of heat required to heat the rinse water to the desired sterilization temperature. An additional advantage in the use of the high temperature rinse water as a portion of the feed solution to the reverse osmosis unit is the substantial reduction in temperature pollution of waste water discharged from the dishwashing apparatus.

While we have disclosed and described a preferred embodiment of our invention, we wish it understood that we do not intend to be restricted solely thereto, but rather that we intend to include all embodiments thereof which would be apparent to one skilled in the art and which come within the spirit and scope of our invention.

We claim:

1. A dishwashing system employing recycled rinse water treated to eliminate spotting of washed dishes rinsed with the treated recycled water without requiring chemical additives in the rinse water to avoid spotting, comprising, dishwasher apparatus having a pre-wash station, a wash station, a rinse station, means for feeding rinse water to the rinse station, and means for recovering used rinse water from the rinse station, first and second heat insulated storage tank means for storing the recovered used rinse water, first heat exchange means in the first storage tank means in heat exchange relation with the stored used rinse water therein, second heat exchange means in the second storage tank means in heat exchange relation with stored rinse water therein, a reverse osmosis unit having an inlet and an outlet and membrane separation means connected between the inlet and outlet for purifying water flowing through the unit, conduit means connecting the first and second storage tank means and connecting the first storage tank means to the dishwashing apparatus and the second storage tank means to the reverse osmosis unit inlet, pressurizing means connected in the conduit means for supplying water through said conduit means to the reverse osmosis unit at a pressure of at least about 400 psig, water mixing means connected in the conduit means between the first and second storage tank means and connected to a source of fresh water for mixing a controlled amount of fresh make-up water to the used water flowing in the conduit means to provide a feed solution to the reverse osmosis unit, the water mixing means including means responsive to the temperature of the feed solution for varying the amount of make-up water mixed with the used water to thereby control the temperature of feed solution flowing to the reverse osmosis unit, and accumulator means connected to the reverse osmosis unit outlet for accumulating water purified by the reverse osmosis unit and flowing from the outlet, the means for feeding rinse water to the rinse station including piping means connecting the accumulator with the second and first heat exchanger means successively and connecting the first heat exchanger means with the rinse station of the dishwasher apparatus, and pump means for raising the pressure of the treated water to a level for use in the dishwasher apparatus and causing a flow of treated water successively through the second and first heat exchanger means to raise the temperature of the treated water by absorbing heat from the used rinse water in the second and first storage tank means.

2. The invention as defined in claim 1 further comprising water softener means connected in the conduit means between the water mixing means and the reverse osmosis unit.

3. The invention as defined in claim 1 wherein said reverse osmosis unit is operable to purify about 75% of the feed solution supplied thereto by the conduit means, the system further comprising piping means connected between the reverse osmosis unit and the pre-washing station of the dishwashing apparatus for delivering to the pre-wash station the portion of the feed solution not purified for use in pre-washing dishes conveyed through the dishwasher.

4. In a dishwashing system employing dishwashing apparatus having a pre-wash station, a wash station, and a rinse station through which dishes are conveyed for washing and rinsing, a method of employing recycled rinse water treated to eliminate spotting of washed dishes rinsed with the treated recycled water without requiring the addition of chemicals to the rinse water to avoid spotting, the method comprising, recovering used rinse water from the rinse station of the dishwashing apparatus and storing the recovered water in first and second heat-insulated storage tanks connected in series with the first storage tank having an inlet connected to the dishwashing apparatus and an outlet connected to the second storage tank and each having a heat exchanger mounted therein in heat-exchange relation with the stored used water, flowing the used water from the storage tanks and mixing a controlled amount of fresh make-up water to the used rinse water flowing from the tanks to provide a feed solution consisting of fresh make-up water and used rinse water, varying the amount of fresh make-up water mixed with the used rinse water as required to control the temperature of the feed solution, flowing the feed solution through a reverse osmosis unit to treat the water by the removal of dissolved ionized mineral salts and non-ionized organic compounds therefrom to provide a supply of treated rinse water, the step of flowing the feed solution through the reverse osmosis unit including pressurizing the liquid to at least about 400 psig before passing through the reverse osmosis unit, storing the treated rinse water in an accumulator, and flowing the treated rinse water from the accumulator to the rinse station of the dishwashing apparatus through the heat exchanger in the second and first heat-insulated storage tanks successively to absorb heat from the used rinse water stored in the respective tanks.

5. The method of claim 4 further comprising the step of flowing the feed solution through a water softener before it reaches the reverse osmosis unit.

6. Method of treatment to regenerate used dishwashing water to produce recyclable deionized and sanitizing water so as to substantially eliminate spotting or film coating of dishes, while at the same time eliminating the need for spot-reducing chemical additives, comprising the steps of providing dishwasher apparatus including at least one rinse station for utilizing heated rinse water, water inlet means to the dishwasher apparatus, and water withdrawal means from the dishwasher apparatus, providing a first heat-insulated storage tank connected to the dishwasher apparatus and a second heat-insulated storage tank connected to the first storage tank, and providing a heat exchanger in each storage tank, withdrawing rinse water from the dishwasher apparatus after usage and delivering the withdrawn water to the first heat-insulated storage tank means for storage in heat-exchange relation with the heat exchanger therein and delivering used rinse water from the first storage tank to the second storage tank for storage in heat-exchange relation with the heat exchanger therein, converting used rinse water from the second storage tank, into a feed solution for membrane separation, cooling such used rinse water by extracting heat through the heat exchanger and by the addition of a controlled amount of fresh make-up water to the used rinse water to provide a feed solution having a temperature in the range of about 70°–80° F. (21°–27° C.), raising the pressure of such feed solution to a pressure in the range of approximately 400–450 psig to enable membrane separation of solutes, providing a reverse osmosis unit with membrane filter means for selective separation of solutes in such feed solution, feeding such feed solution into the reverse osmosis unit for purification and deionization, discharging purified and deionized effluent from the reverse osmosis unit, accumulating such effluent, boosting the pressure of such effluent to a level desired for effective use in dishwashing apparatus, pre-heating such effluent by passing it successively through the heat exchangers in the second and first heat-insulated storage tanks to absorb heat from the used rinse water, further heating such effluent to control bacteria during rinse operations, and returning such heated fluid at a desired pressure to the dishwashing apparatus.

7. The method of claim 6 in which the temperature of the effluent from the reverse osmosis means is raised in temperature to provide rinse operations at a temperature of at least 180° F.

8. The method of claim 6 in which about 90% to about 95% of the non-ionized mineral salts and about 99% of the ionized organic compounds are removed in the reverse osmosis unit.

9. The method of claim 6 in which the make-up water is pretreated to remove chlorine and insoluble precipitating ingredients.

* * * * *